(12) United States Patent
Matsumoto (10) Patent No.: US 10,774,872 B2
(45) Date of Patent: Sep. 15, 2020

(54) LINEAR GUIDE

(71) Applicant: NSK LTD., Tokyo (JP)

(72) Inventor: Jun Matsumoto, Fujisawa (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 16/330,244

(22) PCT Filed: Sep. 5, 2017

(86) PCT No.: PCT/JP2017/031856
§ 371 (c)(1),
(2) Date: Mar. 4, 2019

(87) PCT Pub. No.: WO2018/043750
PCT Pub. Date: Mar. 8, 2018

(65) Prior Publication Data
US 2019/0203766 A1    Jul. 4, 2019

(30) Foreign Application Priority Data

Sep. 5, 2016 (JP) ................................ 2016-172883

(51) Int. Cl.
*F16C 29/06* (2006.01)
*F16C 33/66* (2006.01)
(Continued)

(52) U.S. Cl.
CPC ........ *F16C 29/0609* (2013.01); *B23Q 11/124* (2013.01); *F16C 29/06* (2013.01);
(Continued)

(58) Field of Classification Search
CPC .. F16C 29/06; F16C 29/0609; F16C 29/0633; F16C 29/0635; F16C 29/0638;
(Continued)

(56) References Cited

U.S. PATENT DOCUMENTS 5,769,543 A * 6/1998 Tsukada ............. F16C 29/0609
384/13
5,967,667 A * 10/1999 Yatsu .................... F16C 29/064
384/13

(Continued)

FOREIGN PATENT DOCUMENTS

DE    195 18 834 A1    11/1996
EP    1840396 A2 * 10/2007    .......... F16C 29/0609
(Continued)

OTHER PUBLICATIONS

Communication dated Jul. 9, 2019, issued by the European Patent Office in counterpart European Application No. 17846753.6.

(Continued)

*Primary Examiner* — Marcus Charles
(74) *Attorney, Agent, or Firm* — Sughrue Mion, PLLC (57) ABSTRACT

A lubricant supply member of a linear guide includes a first recessed part formed above a guide rail, a pair of second recessed parts formed at both left and right side-surface positions of the guide rail, and protrusions slidable on rail side raceway surfaces of the guide rail. A lubricating unit includes a first cylindrical part, arranged in the first recessed part, to allow the first recessed part to move in a vertical direction of the slider, and to press the first recessed part to a widthwise outside of the slider, and a pair of second cylindrical parts, arranged in the pair of second recessed parts, to allow the pair of second recessed parts to move in a width direction of the slider, and to press the pair of second recessed parts in the vertical direction of the slider, respectively.

6 Claims, 12 Drawing Sheets

(51) Int. Cl.
 *B23Q 11/12* (2006.01)
 *F16C 29/08* (2006.01)
 *F16N 1/00* (2006.01)

(52) U.S. Cl.
 CPC ...... *F16C 29/0633* (2013.01); *F16C 29/0635* (2013.01); *F16C 29/086* (2013.01); *F16C 33/66* (2013.01); *F16C 33/664* (2013.01); *F16C 33/6648* (2013.01); *F16C 29/0638* (2013.01); *F16C 2212/08* (2013.01); *F16N 1/00* (2013.01)

(58) Field of Classification Search
 CPC .... F16C 29/086; F16C 33/6659; F16C 33/66; F16C 33/6611; F16C 33/664; F16C 33/6648; F16C 2212/08; F16C 2322/39; B23Q 11/124; F16N 1/00
 USPC .................. 384/13, 15, 43, 45, 50
 See application file for complete search history.

(56) References Cited

U.S. PATENT DOCUMENTS

| | | | | |
|---|---|---|---|---|
| 6,082,899 | A * | 7/2000 | Suzuki | F16C 29/0609 184/5 |
| 6,119,813 | A | 9/2000 | Yabe et al. | |
| 6,257,766 | B1 * | 7/2001 | Agari | F16C 29/0609 384/15 |
| 6,290,394 | B1 * | 9/2001 | Obara | B23Q 11/124 384/13 |
| 6,550,968 | B2 * | 4/2003 | Tsukada | F16C 29/0642 384/15 |
| 7,387,441 | B2 * | 6/2008 | Ubukata | F16C 29/0609 384/13 |
| 7,513,336 | B2 * | 4/2009 | Hsu | F16C 29/0609 184/2 |
| 7,740,406 | B2 * | 6/2010 | Kakei | F16C 29/0635 384/13 |
| 8,641,280 | B2 * | 2/2014 | Shibuya | F16C 29/065 384/13 |
| 9,816,559 | B2 * | 11/2017 | Chiu | F16C 33/6659 |
| 2006/0029303 | A1 | 2/2006 | Ubukata et al. | |
| 2007/0012516 | A1 | 1/2007 | Hsu et al. | |
| 2008/0083123 | A1 * | 4/2008 | Hayashi | F16C 29/008 33/1 M |
| 2013/0195386 | A1 * | 8/2013 | Matsumoto | F16C 29/086 384/13 |
| 2015/0337898 | A1 | 11/2015 | Hwang | |

FOREIGN PATENT DOCUMENTS

| | | | | |
|---|---|---|---|---|
| JP | 9-264323 | A | | 10/1997 |
| JP | 2000309792 | A * | 11/2000 | ............. F16C 29/00 |
| JP | 2003-232350 | A | | 8/2003 |
| JP | 2005-207497 | A | | 8/2005 |
| JP | 2005214362 | A * | 8/2005 | ............. F16C 29/06 |
| JP | 2006-046529 | A | | 2/2006 |
| JP | 2006046529 | A * | 2/2006 | ............. F16C 33/66 |
| JP | 2007-263366 | A | | 10/2007 |
| JP | 2007285479 | A * | 11/2007 | ............. F16C 33/76 |
| JP | 3194309 | U | | 11/2014 |

OTHER PUBLICATIONS

International Search Report (PCT/ISA/210) dated Dec. 12, 2017 issued by the International Searching Authority in International Application No. PCT/JP2017/031856.
Written Opinion (PCT/ISA/237) dated Dec. 12, 2017 issued by the International Searching Authority in International Application No. PCT/JP2017/031856.
Communication dated Jun. 24, 2020 issued by the State Intellectual Property Office of P.R. China in counterpart Chinese Application No. 201780054472.7.

* cited by examiner

LINEAR GUIDE

CROSS REFERENCE TO RELATED APPLICATIONS

This application is a 371 of International Application No. PCT/JP2017/031856, filed on Sep. 5, 2017, which claims priority from Japanese Application No. 2016-172883, filed on Sep. 5, 2016. The entire disclosures of the prior applications are considered part of the disclosure of the accompanying continuation application, and are hereby incorporated by reference.

TECHNICAL FIELD

The present invention relates to a linear guide, and particularly to a linear guide in which a lubricant can be supplied to contact portions of a guide rail, a slider, and a rolling body over a long period of time.

BACKGROUND ART

In the related art, a linear guide includes a guide rail extending in an axial direction and a slider straddling the guide rail to move relatively. The slider relatively moves on the guide rail in the axial direction through a plurality of rolling bodies (ball) which circulate in rolling body rolling grooves formed in the guide rail and the slider. Such a linear guide is widely used for linear moving mechanisms of various production facilities. In order that the linear guide is stably used over a long period of time, it is important to supply a sufficient amount of lubricant to the rolling body rolling groove and the ball to maintain an excellent lubricating state.

Patent Document 1 describes that a linear guide bearing device in which a porous lubricant supply member containing a lubricant is housed in a case and is attached in the end portion of the slider, and the lubricant is supplied from the lubricant supply member contacting with the rolling body rolling groove of the guide rail. In addition, Patent Document 2 discloses a dustproof device for a linear guide bearing in which a slide guide member which is formed of a material made of a rubber or a synthetic resin impregnated with a lubricant in advance is screw-fixed to be assembled with the end portion of a bellows-type dustproof device fixed in the slider, and the lubricant is supplied from the slide guide member to the guide rail.

PRIOR ART DOCUMENT

Patent Document

Patent Document 1: Japanese Unexamined Patent Application Publication No. 2006-46529
Patent Document 2: Japanese Unexamined Patent Application Publication No. 09-264323

SUMMARY OF THE INVENTION

Problems to be Solved by the Invention

Figure 15A:
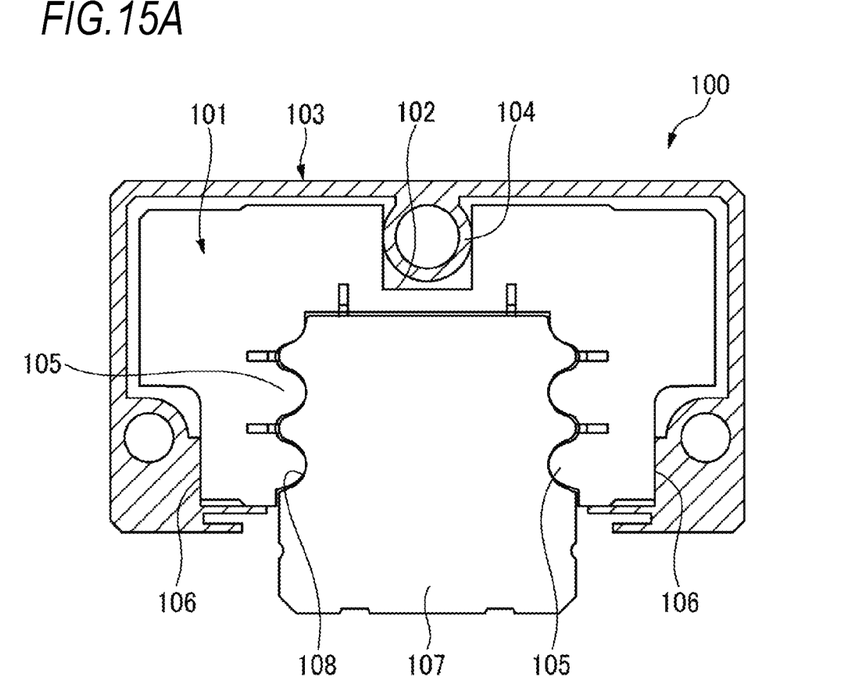
FIG. 15A is a side view illustrating a conventional lubricating unit.

Incidentally, in a lubricating unit 100 of Patent Document 1, as illustrated in FIG. 15A, a lubricant supply member 101 containing a lubricant is stored in a case 103 formed integrally a cylindrical part 104. In addition, in a lubricant supply member 101, the cylindrical part 104 of the case 103 is fitted in a recessed part 102 formed at the upper portion. The upper end portion of the lubricant supply member 101 is pressed and deformed to the widthwise outside of the slider, and the rear surface of the sliding part 105 of the lubricant supply member 101 is pressed by pressing parts 106 provided in both side surfaces of the case 103 to be pressed to a rolling body rolling groove 108 of a guide rail 107, so as to supply the lubricant.

Figure 15B:
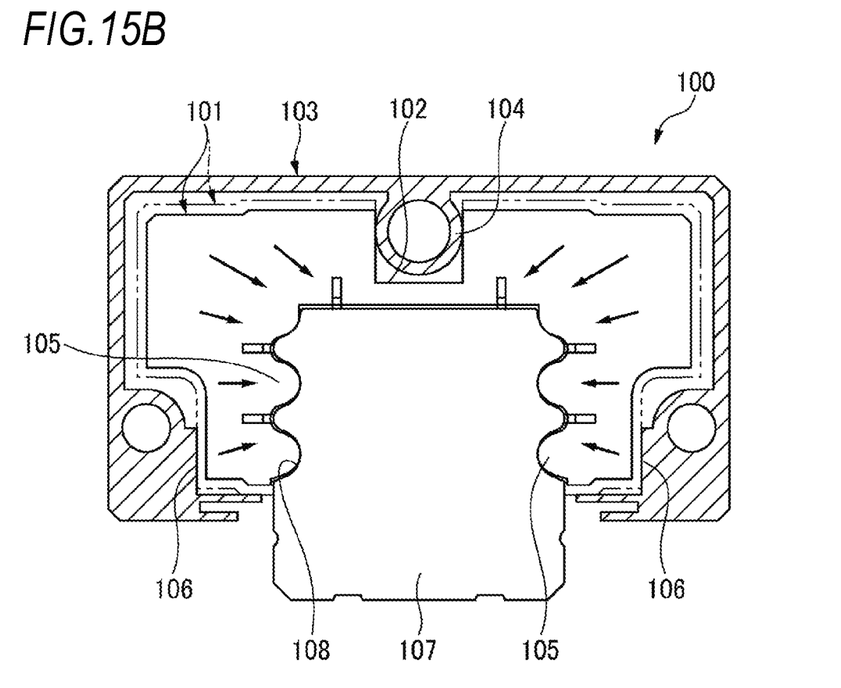
FIG. 15B is a side view illustrating a state where a lubricant supply member is deformed due to reduction of a contained lubricant.

However, as illustrated in FIG. 15B, when the amount of the lubricant impregnated in the lubricant supply member 101 decreases over a long-term use, the dimension of the lubricant supply member 101 decrease as indicated by the solid line in the drawings from the state indicated by the broken line in the drawings, the pressing force generated by the cylindrical part 104 and the pressing part 106 is reduced, the contact state between the lubricant supply member 101 and the rolling body rolling groove 108 of the guide rail 107 is changed, and a sufficient lubricating state cannot be maintained, which is problematic. Particularly, when the lubricant content of the lubricant supply member 101 is extremely high, the dimensional change of the lubricant supply member 101 due to the reduction of the lubricant is large, and the possibility of causing the above-described trouble is increased.

Figure 16A:
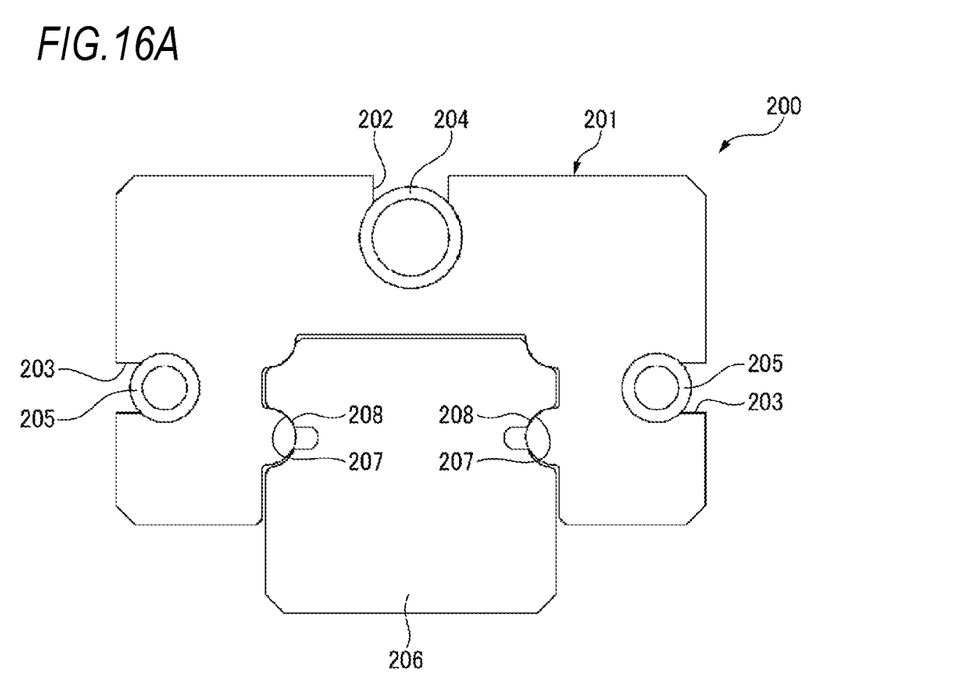
FIG. 16A is a side view illustrating another conventional lubricating unit.

In a conventional lubricating unit 200 illustrated in FIG. 16A, a lubricant supply member 201 includes a substantially U-shaped upper groove 202 formed at the upper portion, a pair of substantially U-shaped lateral grooves 203 which is formed on both side surfaces, and a sliding part 208 which slides into contact with a rolling body rolling groove 207 of a guide rail 206. An upper ring 204 is provided in the upper groove 202, side surface rings 205 are provided in the pair of lateral grooves 203, respectively, and a side seal (not illustrated) and a screw (not illustrated) for fixing the lubricating unit 200 in the slider is inserted into the side surface ring 205. For this reason, a relative position between the side surface ring 205 and the guide rail 206 is fixed through a rolling body (not illustrated).

Figure 16B:
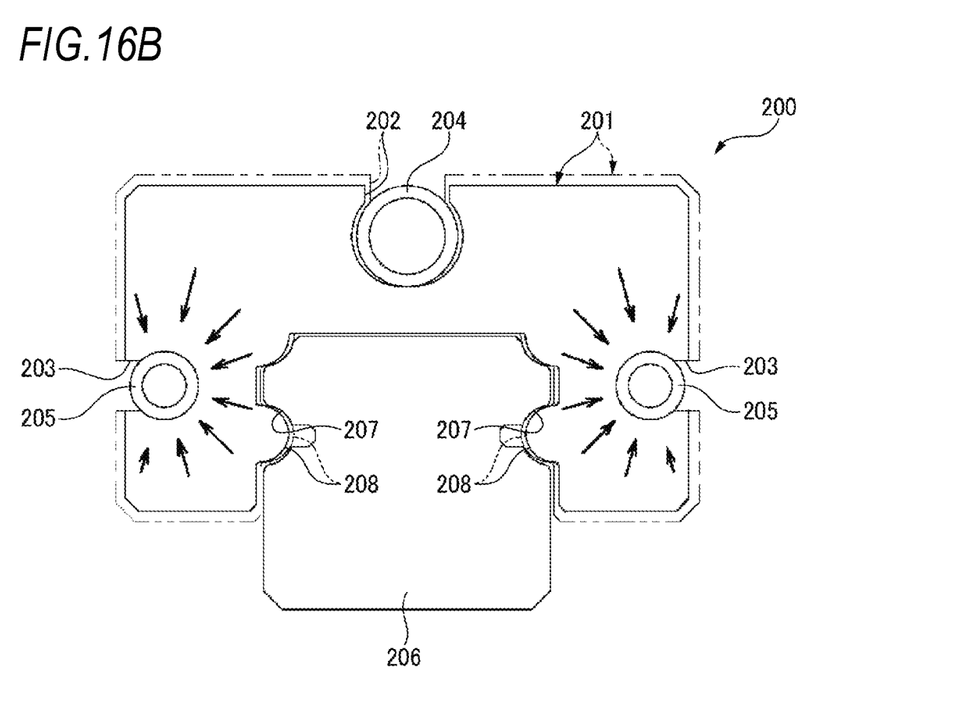
FIG. 16B is a side view illustrating a state where a lubricant supply member is deformed due to reduction of a contained lubricant.

Even in this case, as illustrated in FIG. 16B, when the amount of the lubricant impregnated in the lubricant supply member 201 is reduced due to the long-term use, the dimension of the lubricant supply member 201 decreases as indicated by the solid line in the drawings from the state indicated by the broken line in the drawings. At this time, the position of the side surface ring 205 is fixed. Thus, the lubricant supply member 201 is deformed toward the side surface ring 205 in an arrow direction. As a result, the contact state between the sliding part 208 of the lubricant supply member 201 and the rolling body rolling groove 207 of the guide rail 206 is changed, and a sufficient lubricating state cannot be maintained, which is problematic.

The invention has been made in consideration of the above-described problems, and an object thereof is to provide a linear guide in which a lubricating unit can stably supply a lubricant over a long period of time.

Means for Solving the Problems

The object of the invention is achieved by the following configurations.

A linear guide including a guide rail; a slider slidably engaged to straddle the guide rail; and a lubricating unit including a lubricant supply member capable of being impregnated with a lubricant, the lubricating unit being attached in an axial end portion of the slide. The lubricant supply member includes a first recessed part formed above the guide rail, a pair of second recessed parts formed at both left and right side-surface positions of the guide rail, and protrusions slidable on rail side raceway surfaces of the guide rail. The lubricating unit includes an upper pressing unit, arranged in the first recessed part, to allow the first recessed part to move in a vertical direction of the slider, and to press the first recessed part to a widthwise outside of the slider; and a pair of side surface pressing units, arranged in the pair of second recessed parts, to allow the pair of second recessed parts to move in a width direction of the slider, and to press the pair of second recessed parts in the vertical direction of the slider, respectively.

The lubricating unit includes the lubricant supply member and a case housing the lubricant supply member; and the upper pressing unit and the pair of side surface pressing units are provided in the case.

At least one of the upper pressing unit and the pair of side surface pressing units is a cylindrical part of which an outer diameter is larger than a width of the first recessed part and widths of the pair of second recessed parts.

Chamfered parts are provided in tip side edge parts of the cylindrical parts configuring the upper pressing unit and the pair of side surface pressing units. A lower surface of the upper pressing unit has a flat surface part notched in a horizontal direction and a widthwise side surface of the side surface pressing unit has a flat surface part notched in a vertical direction.

Effect of the Invention

According to the linear guide of the invention, the lubricant supply member capable of being impregnated with the lubricant, the first recessed part which is formed above the guide rail, the pair of second recessed parts which are formed at both left and right side-surface positions of the guide rail, and the protrusions which are slidable on the rail side raceway surfaces of the guide rail. In addition, the lubricating unit includes the upper pressing unit which is arranged in the first recessed part to allow the first recessed part to move in the vertical direction of the slider, and to press the first recessed part to the widthwise outside of the slider, and the pair of side surface pressing units which are arranged in the pair of second recessed parts to allow the pair of second recessed parts to move in the width direction of the slider, and to press the pair of second recessed parts in the vertical direction of the slider, respectively. Accordingly, the amount of the impregnated lubricant decreases over a long-term use. Although the dimension of the lubricant supply member is reduced, the first recessed part is pressed to the widthwise outside of the slider by the upper pressing unit, and the pair of second recessed parts are pressed in the vertical direction of the slider by the pair of side surface pressing units, respectively. Thus, the force of the protrusions of the lubricant supply member pressing the rail side raceway surfaces is secured, and the supply of the lubricant is secured. Therefore, the lubricating unit can stably supply the lubricant over a long period of time.

DESCRIPTION OF EMBODIMENTS

Hereinafter, a linear guide according to embodiments of the invention will be described in detail on the basis of the drawings. Incidentally, in the following description, a vertical direction and a width direction of a slider represent directions in a state where the slider is assembled to a guide rail arranged with the longitudinal direction horizontal. The width direction of the slider is perpendicular to the longitudinal direction of the guide rail and the vertical direction of the slider and is also referred to as a left and right direction.

First Embodiment

Figure 1:
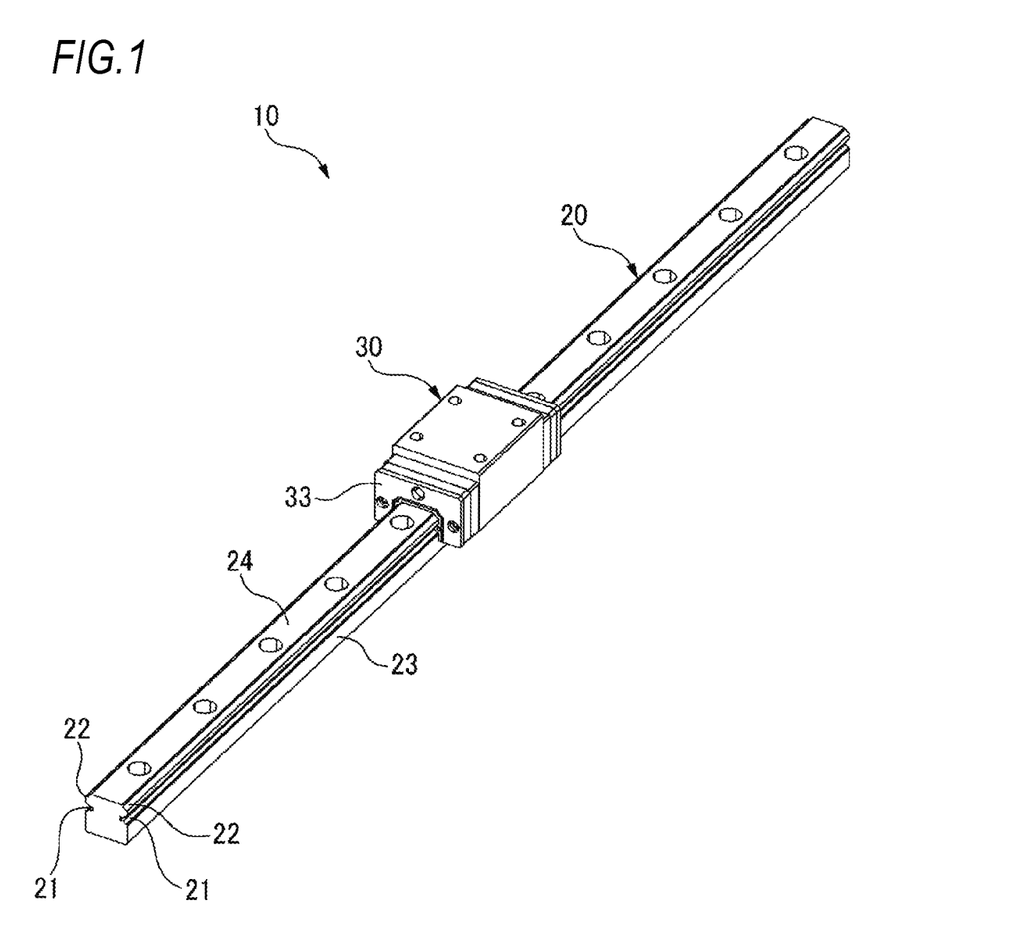
FIG. 1 is a perspective view illustrating a linear guide according to the invention.

As illustrated in FIG. 1, a linear guide 10 of a first embodiment includes a linear guide rail 20 and a slider 30 which is assembled to straddle the guide rail 20 and is slidably engaged through a plurality of rolling bodies (ball) (not illustrated).

Rail side raceway surfaces 21 having a semicircular cross section or a Gothic arch-shaped cross section are formed on both side surfaces 23 of the guide rail 20 in an axial direction. The ridge line portions where the upper surface 24 of the guide rail 20 intersects with the both side surfaces 23, and rail side raceway surfaces 22 having a substantially quarter arc-shaped cross section are formed in the axial direction.

Figure 2:
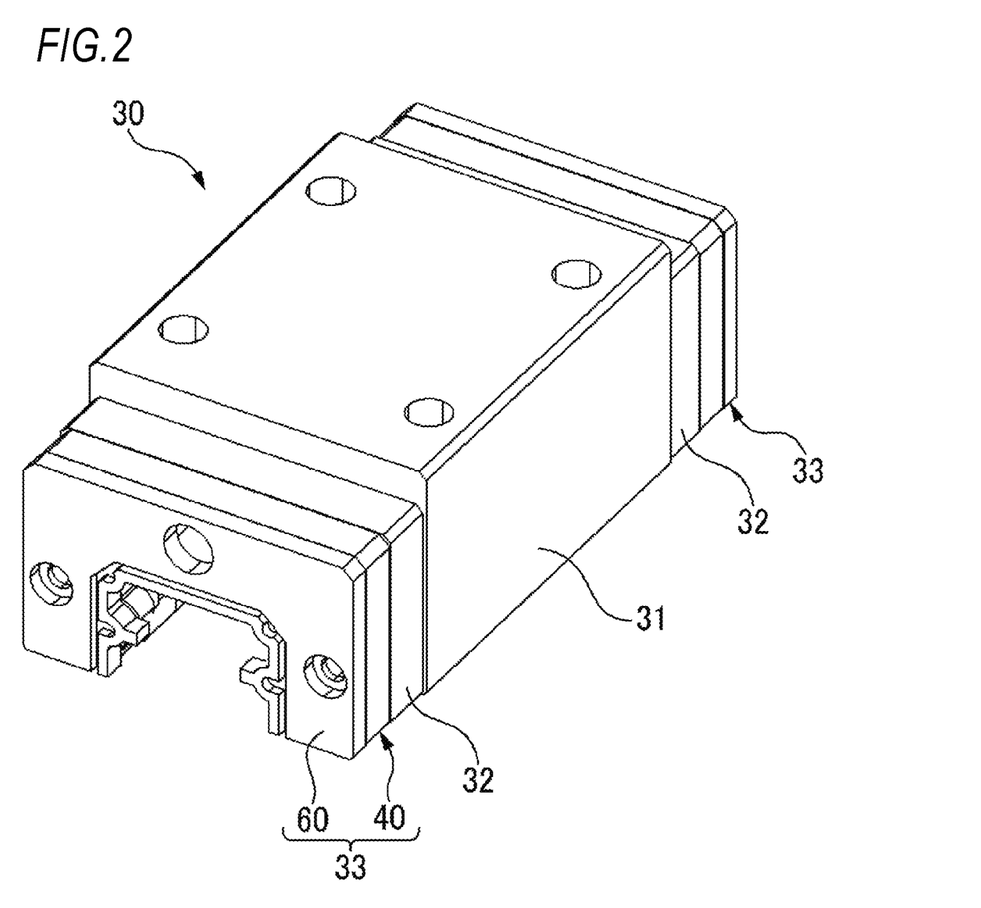
FIG. 2 is a perspective view illustrating a slider illustrated in FIG. 1.
Figure 3:
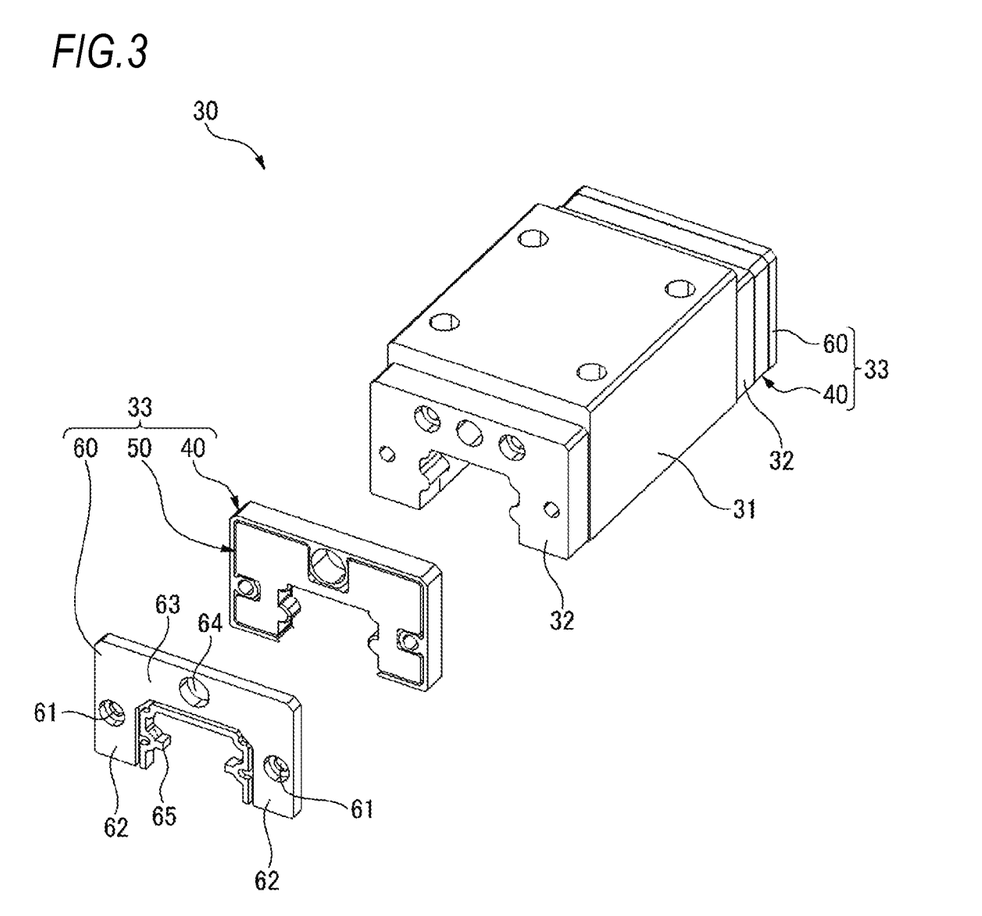
FIG. 3 is an exploded perspective view partially illustrating the slider illustrated in FIG. 2.

As illustrated in FIGS. 2 and 3, the slider 30 includes a slider body 31, end caps 32 which are attached in both axial end portions of a slider body 31 and a lubricating unit 33 which is attached in the further axial end portion of each of the end caps 32.

The slider body 31 is formed in a substantially U-shape, and the inner surfaces of both sleeve parts are provided with slider side raceway surfaces (not illustrated) facing the rail side raceway surfaces 21 and 22 of the guide rail 20 and rolling body return paths. In addition, the end cap 32 formed in a substantially U-shape has a curved path (not illustrated) which communicates with the slider side raceway surface and the rolling body return path of the slider body 31. A rolling body circulation path is formed by the rail side raceway surfaces 21 and 22, the slider side raceway surfaces, the rolling body return paths, and the curved paths of both end portions. A plurality of balls are loaded in a rollable manner in the rolling body circulation path.

Figure 4:
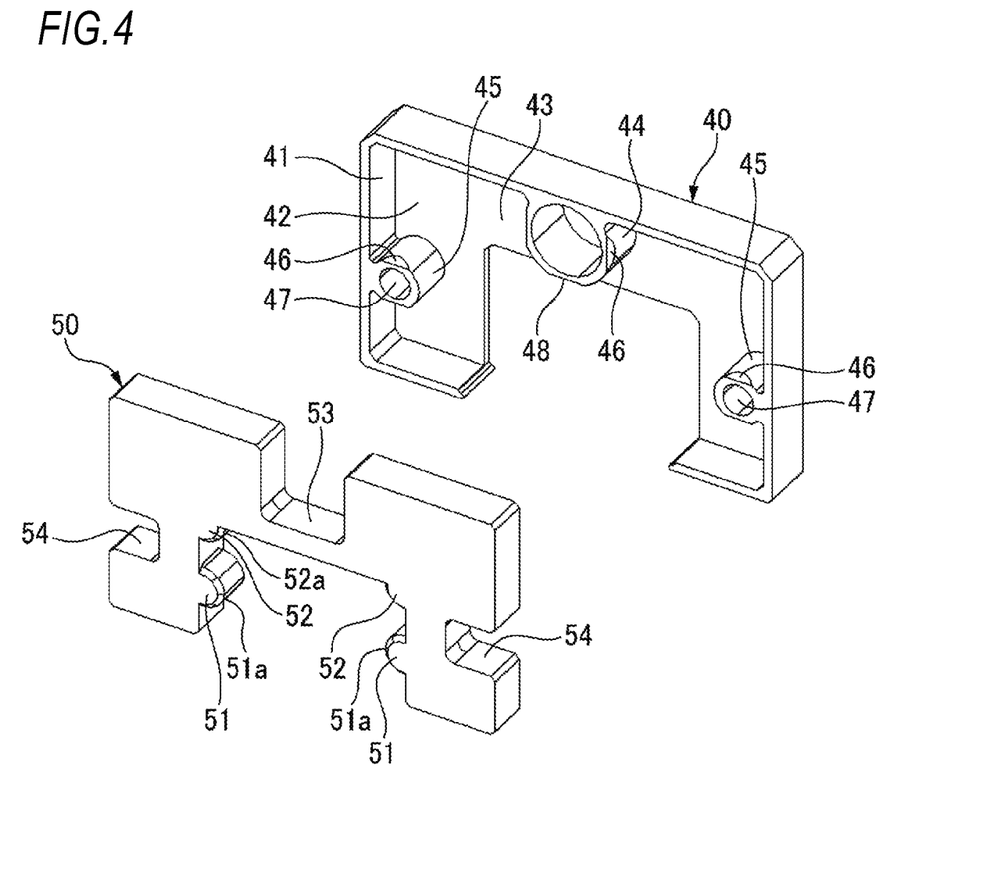
FIG. 4 is an exploded perspective view illustrating a lubricant supply member of a lubricating unit and a case illustrated in FIG. 3.

With reference to FIGS. 3 and 4, the lubricating unit 33 includes a synthetic resin case 40, a lubricant supply member 50 housed in the case 40, and a side seal 60.

The side seal 60 is a substantially U-shaped steel plate fitted to the outer shape of the end cap 32. Through holes 61 for attachment screws are formed in both sleeve parts 62, and a through hole 64 for grease nipples is formed in a connection part 63 which connects the both sleeve parts 62. The side seal 60 and the guide rail 20 are in non-contact. An elastic body 65 such as a nitrile rubber and a polyurethane rubber containing grease is provided inside a U-shaped portion in order to seal a gap between the slider 30 and the guide rail 20.

The lubricant supply member 50 is molded in a substantially U-shape so as to face the upper surface 24 of the guide rail 20 and the both side surfaces 23 including the rail side raceway surfaces 21 and 22. The lubricant supply member 50 is formed by a porous body such as a rubber or a synthetic resin, an entangled fiber body, or the like, and is impregnated with a lubricant. Mineral oil, synthetic oil, grease, or the like can be used as the lubricant. Polyurethane, polyethylene, polypropylene, or the like can be used as the synthetic resin. A wool felt, a polyester fiber, a nylon fiber, an acrylic fiber, or the like can be used as the entangled fiber body.

The lubricant impregnation amount of the lubricant supply member 50 is preferably 70 wt % or more from the viewpoint of the long-term use. In addition, the upper limit of the lubricant impregnation amount is preferably 85 wt % or less in consideration of the strength of the lubricant supply member 50. For example, as one example of this embodiment, the lubricant supply member 50 is molded by mixing polyethylene and mineral oil in a weight ratio of 15:85.

Substantially semicircular protrusions 51 for supplying a lubricant by sliding into contact with the rail side raceway surface 21 of the guide rail 20 protrude from the inside of the both side surfaces of the U-shaped portion of the lubricant supply member 50. In addition, quarter arc-shaped protrusions 52 for supplying a lubricant by sliding into contact with the rail side raceway surface 22 of the guide rail 20 protrude from the inner corner portions between the both side surfaces of the U-shaped portion and the upper surface.

Further, a first recessed part 53 open upward is formed substantially in the center of the upper end portion of the lubricant supply member 50. In addition, substantially U-shaped second recessed parts 54 open sideways are formed on both outer side surfaces of the lubricant supply member 50. The first recessed part 53 is formed in a substantially U-shape to have two surfaces which face each other in the width direction in parallel. The second recessed part 54 is formed in a substantially U-shape to have two surfaces which face each other in the vertical direction in parallel, and corner parts 54a between the two surfaces and a vertical surface are formed in a curved surface shape.

Incidentally, as illustrated in FIG. 4, chamfered parts 51a and 52a are formed in the end surface edge portions of the protrusions 51 and 52 in the thickness direction, respectively. During an assembling work to a machine device, the slider 30 of the linear guide 10 may be detached from the guide rail 20 and be attached to the guide rail 20 again. At this time, the edge portions of the end surfaces of the protrusions 51 and 52 of the lubricant supply member 50 may interfere with the edges of the end surfaces of the rail side raceway surfaces 21 and 22 of the guide rail 20. However, the chamfered parts 51a and 52a are provided to prevent the interference and improve an assembling working property.

The case 40 is manufactured by injection-molding a hard resin such as a polyacetal or a polyamide and is formed in a substantially U-shape having almost the same size as that of the end cap 32. In the case 40, a storage part 43 for storing the lubricant supply member 50 is formed by an outer peripheral wall 41 covering the outer peripheral portion of the housed lubricant supply member 50 and an end wall 42 covering the axial end surface of the lubricant supply member 50.

In the substantially lateral center portion in the upper portion in the storage part 43, a first cylindrical part 44 which is an upper pressing unit is formed continuously to the outer peripheral wall 41 and the end wall 42. In addition, in the substantially heightwise center portions in both left and right side-surfaces in the storage part 43, second cylindrical parts 45 which are side surface pressing units are formed symmetrically continuously to the outer peripheral wall 41 and the end wall 42. In addition, a screw insertion hole 47 for screw-fixing the lubricating unit 33 in the slider body 31 is provided in the second cylindrical part 45.

Incidentally, the case 40 may be manufactured by cutting or pressing a metal material such as steel or aluminum.

Figure 5A:
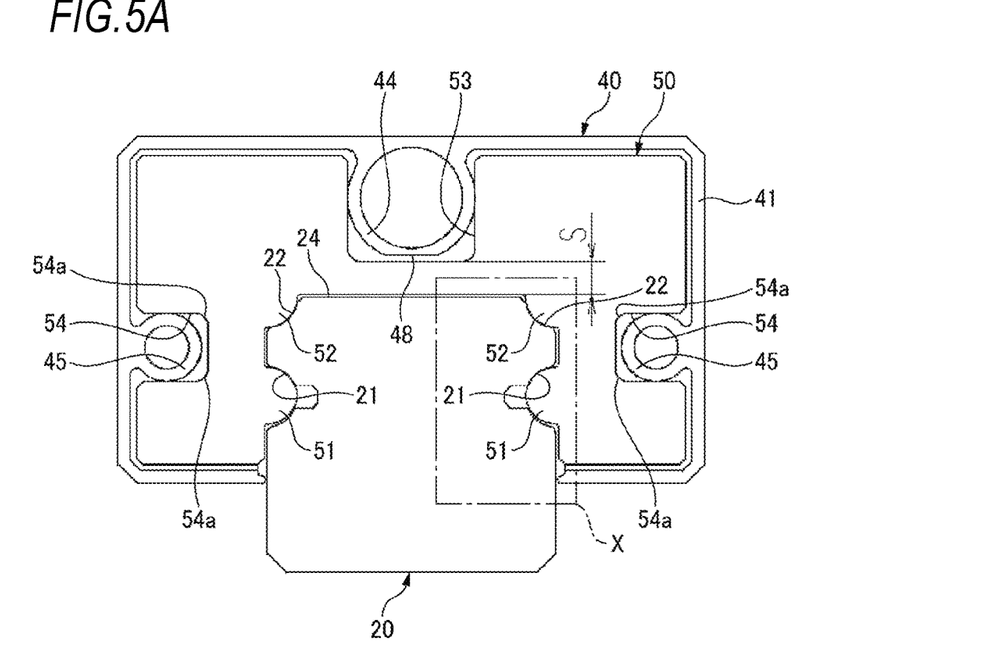
FIG. 5A is a side view illustrating a state where the lubricant supply member is housed in the case.
Figure 5B:
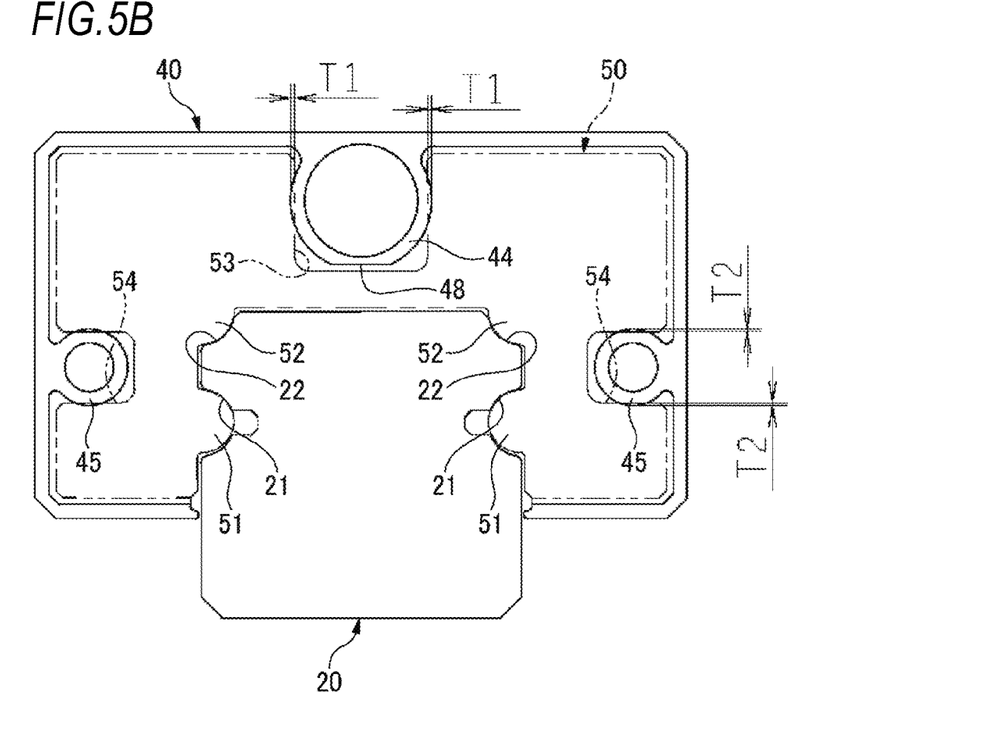
FIG. 5B is a side view for explaining a dimensional relation between a recessed part of the lubricant supply member housed in the case and a cylindrical part of the case.
Figure 6:
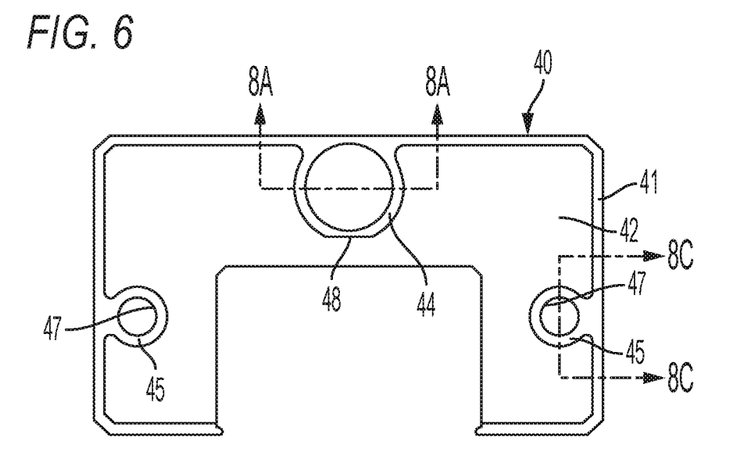
FIG. 6 is a side view illustrating the case.

As illustrated in FIGS. 5A and 5B, the first cylindrical part 44 of the case 40 is fitted to the first recessed part 53 of the lubricant supply member 50, and the second cylindrical parts 45 are fitted to the pair of second recessed parts 54, respectively, whereby the lubricant supply member 50 is stored in the storage part 43 of the case 40.

As described above, the case 40 stores the lubricant supply member 50, so as to prevent that the lubricant supply member 50 is damaged during handling. Particularly, when the lubricant impregnation amount of the lubricant supply member 50 becomes 70 wt % or more, the amount of the resin is reduced that much, and the strength of the lubricant supply member 50 is lowered. Thus, the use of the case 40 is effective.

As illustrated in FIG. 5B, an outer diameter D3 (see FIG. 8A) of the first cylindrical part 44 is set to be larger than the inner width (left and right width) of the first recessed part 53. Thus, the first cylindrical part 44 and the first recessed part 53 interfere by T1 per one side surface. In addition, an outer diameter D3' (see FIG. 8C) of the second cylindrical part 45 is set to be larger than the inner width (vertical width) of the second recessed part 54. Thus, the second cylindrical part 45 and the second recessed part 54 interfere by T2 per one side surface. That is, the first cylindrical part 44 is press-fitted into the first recessed part 53 with the fastening margin T1, and the second cylindrical part 45 is press-fitted into the second recessed part 54 with the fastening margin T2. The fastening margins T1 and T2 between the cylindrical parts 44 and 45 and the recessed parts 53 and 54 are preferably about 0.1 to 0.5 mm.

For example, as one example of this embodiment, the first cylindrical part 44 is press-fitted into the first recessed part 53 of the lubricant supply member 50 with the fastening margin T1 of 0.3 mm, and the second cylindrical part 45 is press-fitted into the second recessed part 54 with the fastening margin T2 of 0.2 mm Incidentally, the first cylindrical part 44 applies a widthwise pressing force to the first recessed part 53. However, a vertical movement is allowed and is not restricted. In addition, the second cylindrical part 45 applies a vertical pressing force to the second recessed part 54. However, a widthwise movement is allowed and is not restricted.

In addition, in this embodiment, the first cylindrical part 44 and the second cylindrical part 45 are provided continuously to the outer peripheral wall 41 of the case 40. Thus, the outer diameter D3 of the first cylindrical part 44 and the outer diameter DY of the second cylindrical part 45 are given by respective facing arc surfaces.

Figure 7:
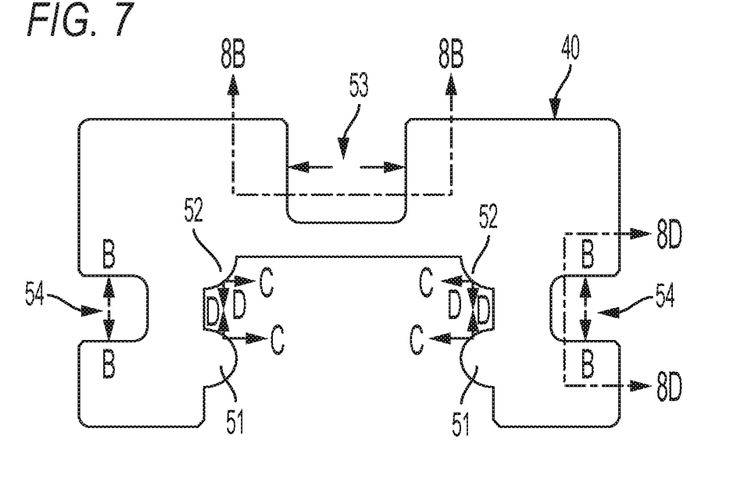
FIG. 7 is a side view of the lubricant supply member illustrating a direction of being pressed and displaced due to interference with the cylindrical part of the case.

The first cylindrical part 44 is press-fitted into the first recessed part 53 with the fastening margin T1, so that the pressing force in a direction (direction of arrow A) of widening the inner width of the first recessed part 53 acts on the first recessed part 53 as illustrated in FIG. 7. Accordingly, the protrusions 51 and 52 of the lubricant supply member 50 are displaced in the width direction (direction of arrow C), so that the pressing force of the protrusions 51 and 52 to the rail side raceway surfaces 21 and 22 of the guide rail 20 increases.

The second cylindrical part 45 is press-fitted into the second recessed part 54 with the fastening margin T2, so that the pressing force in a direction (direction of arrow B) of widening the inner width of the second recessed part 54 acts on the second recessed part 54. Accordingly, the protrusion 51 and the protrusion 52 of the lubricant supply member 50 are displaced in the vertical direction (direction of arrow D) of approaching each other, so that the pressing force of the protrusions 51 and 52 to the rail side raceway surfaces 21 and 22 of the guide rail 20 increases.

Therefore, the lubricant is reliably supplied to the rail side raceway surfaces 21 and 22 by the protrusions 51 and 52 of the lubricant supply member 50. The pressing force of the protrusions 51 and 52 to the rail side raceway surfaces 21 and 22 is adjusted according to the dimensions of the first and second recessed parts 53 and 54 and the first and second cylindrical parts 44 and 45.

As illustrated in FIGS. 8A to 8D, in the case 40, the outer diameters D3 and D3' of the first and the second cylindrical parts 44 and 45 are larger than the inner widths D1 and D1' of the first and second recessed parts 53 and 54. Therefore, when the lubricant supply member 50 is housed in the case 40, the fastening margin T1 of the first cylindrical part 44 and the first recessed part 53 becomes (D3−D1)/2, and the fastening margin T2 of the second cylindrical part 45 and the second recessed part 54 becomes (D3'−D1')/2.

Figure 8A:
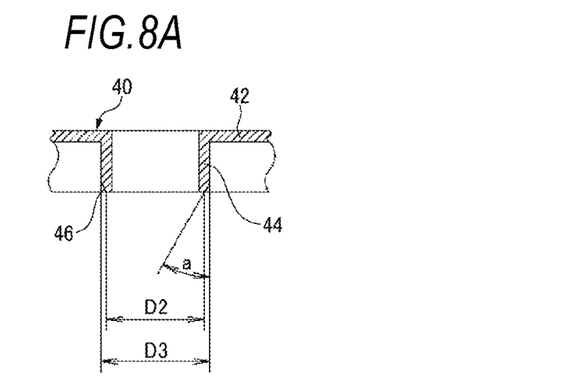
FIG. 8A is a sectional view taken along line 8A-8A of FIG. 6.
Figure 8B:
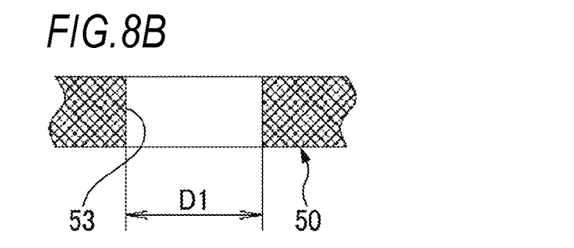
FIG. 8B is a sectional view taken along line 8B-8B of FIG. 7.
Figure 8C:
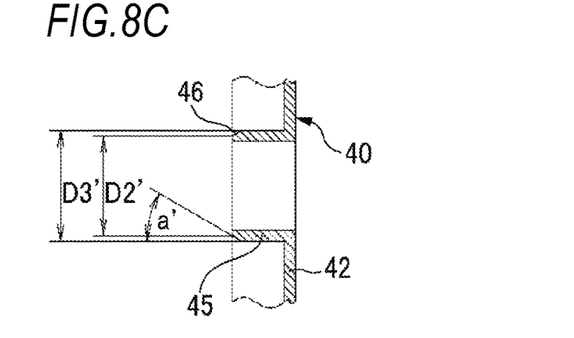
FIG. 8C is a sectional view taken along line 8C-8C of FIG. 6.
Figure 8D:
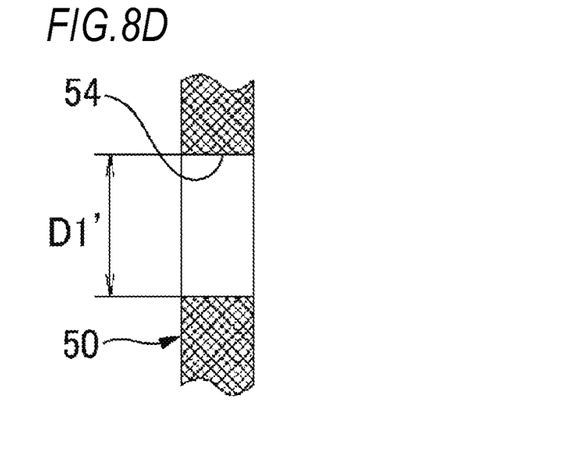
FIG. 8D is a sectional view taken along line 8D-8D of FIG. 7.

The first cylindrical part 44 is press-fitted in both planar side surfaces of the first recessed part 53 with the fastening margin T1, and the contact portion of the first recessed part 53 discharges the lubricant for relieving stress and contracts in the width direction of the slider. In addition, the second cylindrical part 45 is press-fitted in the planar upper and lower surfaces of the second recessed part 54 with the fastening margin T2. Thus, the contact portion of the second recessed part 54 discharges the lubricant for relieving stress and contracts in the vertical direction of the slider. Therefore, the lubricant supply member 50 is restrained by the case 40 in the vertical direction and the width direction of the slider. Thus, the posture of the lubricant supply member 50 can be stabilized.

For this reason, the planar lower surface of the first recessed part 53 and the planar side surface of the second recessed part 54 are not restrained. Thus, the posture of the lubricant supply member 50 can be further stabilized by the contact portion of the first recessed part 53 and the second recessed part 54 even in a case where the lubricant supply member 50 contracts.

In the first and second cylindrical parts 44 and 45, as illustrated in FIGS. 8A and 8C, tip side edge parts of the cylindrical parts 44 and 45, specifically, two widthwise places of the tip side edge part of the cylindrical part 44 and two vertical places of the tip side edge part of the cylindrical part 45 are provided with the chamfered parts 46 of angles a and a'. For this reason, distances D2 and D2' of the tip side edge parts of the cylindrical parts 44 and 45 are smaller than the inner widths D1 and Dr of the first and second recessed parts 53 and 54. Accordingly, the lubricant supply member 50 is easily mounted in the case 40. Chamfering angles a and a' are preferably 15 to 45°, and chamfering amounts D3−D2 and D3'−D2' are preferably about 0.5 to 2 mm.

In the case 40 of this embodiment, the chamfering angles a and a' are 30°, and the chamfering amounts D3−D2 and D3'−D2' are 1 mm.

As illustrated in FIG. 5A, in the case 40 of this embodiment, the lower surface of the first cylindrical part 44 having a cylindrical shape is notched in a horizontal direction, and a flat surface part 48 is provided. Accordingly, the distance between the upper surface 24 of the guide rail 20 and the flat surface part 48 which is the lower surface of the first cylindrical part 44 is increased, and a width S of the lubricant supply member 50 which is arranged between the upper surface 24 and the flat surface part 48 can be widened to improve the strength of the lubricant supply member 50. Accordingly, even when the content of the lubricant is increased, the possibility of the deformation or the breakage of the lubricant supply member 50 is reduced, and the handling is facilitated.

In the linear guide 10 configured as described above, when the slider 30 moves on the guide rail 20, the ball in the slider 30 repeatedly circulates in the rolling body circulation path. At this time, the protrusions 51 and 52 of the lubricant supply member 50 slide into contact with parts of the rail side raceway surfaces 21 and 22 of the guide rail 20, and the lubricant impregnated in the lubricant supply member 50 is oozed to be automatically supplied to the rail side raceway surfaces 21 and 22 and the ball. Accordingly, in the linear guide 10, a stable and smooth operation is performed over a long period of time.

Figure 9:
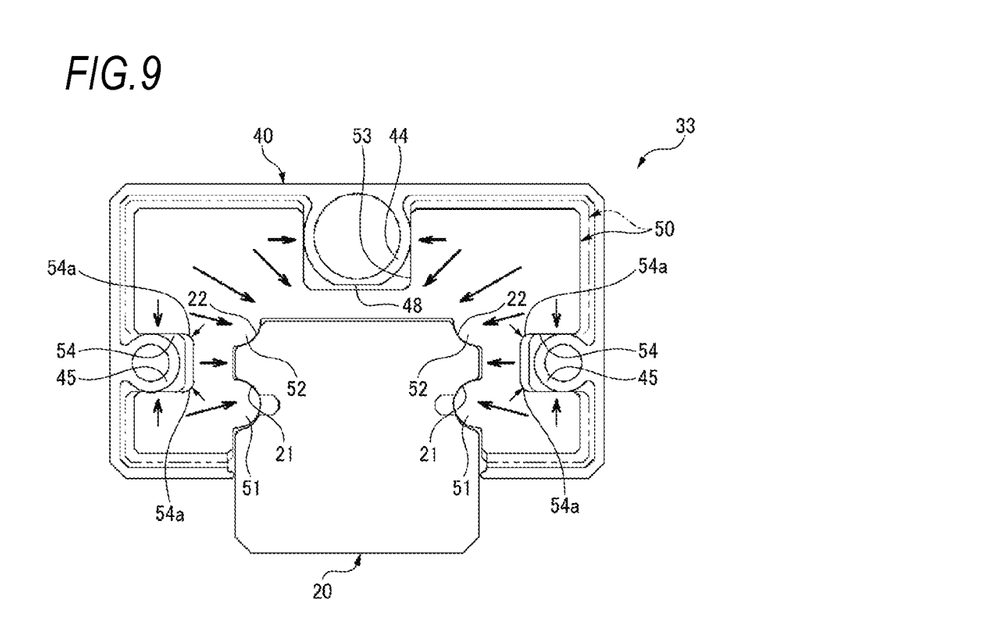
FIG. 9 is a side view illustrating a state where a lubricant supply member is deformed due to reduction of a contained lubricant in a lubricating unit of a first embodiment.

When the linear guide 10 is used for a long period, the lubricant impregnated in the lubricant supply member 50 is reduced, and as illustrated in FIG. 9, the dimension of the lubricant supply member 50 decreases as indicated by the solid line in the drawings from the state indicated by the broken line in the drawings.

By the dimensional change, the width dimension of the first recessed part 53 and the vertical dimension of the second recessed part 54 also decrease. However, since the first cylindrical part 44 is press-fitted into the first recessed part 53, and the second cylindrical part 45 is press-fitted into the second recessed part 54, the width dimension of the first recessed part 53 and the vertical dimension of the second recessed part 54 are not changed, and the pressing force of the first and second recessed parts 53 and 54 according to the first and second cylindrical parts 44 and 45 increases.

Accordingly, the substantially semicircular protrusion 51 and the quarter arc-shaped protrusion 52 of the lubricant supply member 50 are displaced in a direction of approaching the rail side raceway surfaces 21 and 22 of the guide rail 20 (direction of arrows C and D of FIG. 7), and the contact between the rail side raceway surfaces 21 and 22 is maintained regardless of the contract deformation of the lubricant supply member 50. That is, although the lubricant supply member 50 is changed dimensionally, the lubricant is supplied stably from the lubricant supply member 50.

When the dimension of the lubricant supply member 50 is reduced, the stress is applied also to the corner part 54a of the second recessed part 54, but the stress concentration is relieved since the corner part 54a is formed in a curved shape.

Particularly, in the lubricant supply member 50 of this embodiment, the content of the lubricant is set to be high at 85 wt %, and the reduction amount of the lubricant, that is, the dimensional change (reduction) is also enlarged. Thus, the effect of the invention becomes remarkable.

Figure 10:
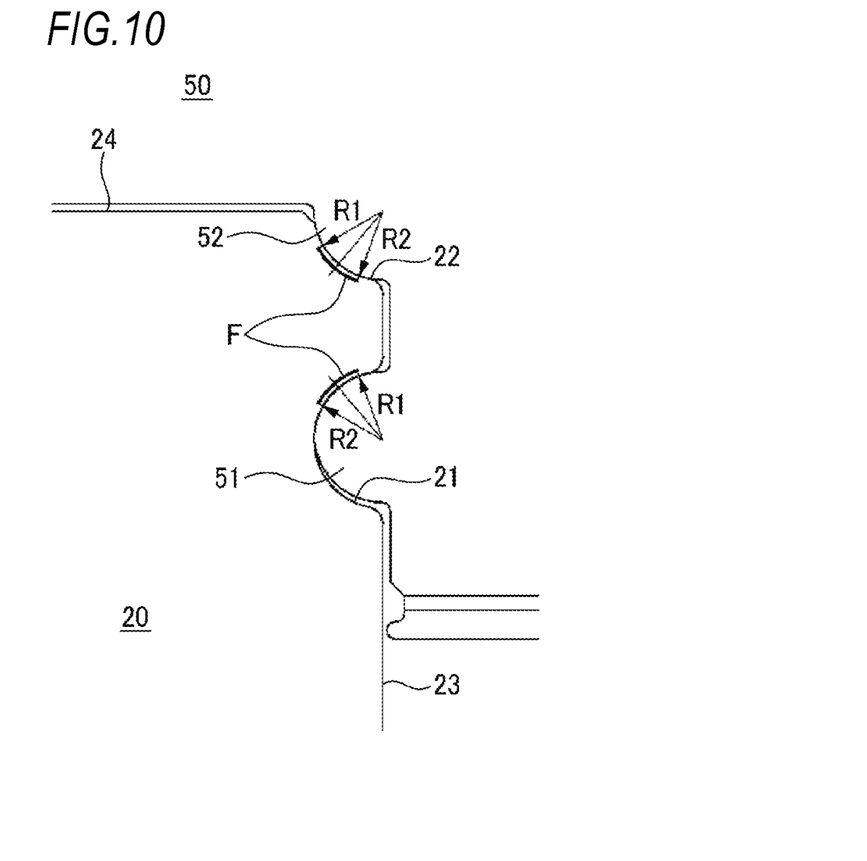
FIG. 10 is an enlarged view illustrating an X portion of FIG. 5A.

FIG. 10 is an enlarged view illustrating the main portions in a state where the rail side raceway surface contacts with the protrusion of the lubricant supply member. In the lubricating unit 33 of this embodiment, the contact areas between the rail side raceway surfaces 21 and 22 and the protrusions 51 and 52 of the lubricant supply member 50 are indicated by emphasis lines F in the drawings and are limited to the vicinity of the portion contacting with the ball. Specifically, a radius R1 of the protrusions 51 and 52 of the lubricant supply member 50 is set to be slightly smaller than a radius R2 of the rail side raceway surfaces 21 and 22 and to be 95 to 99% of the radius R2. Alternatively, partial protrusions may be provided in the protrusions 51 and 52 of the lubricant supply member 50, such that only the protrusions are brought into contact with the rail side raceway surfaces 21 and 22.

Accordingly, in portions other than the vicinity of the portion contacting with the ball, a gap with about 0.1 to 0.5 mm is formed between the portions and the lubricant supply member 50, so that the contact is not made therebetween. The sliding resistance against the lubricant supply member 50 is reduced so that the energy consumption of a driving motor can be reduced. In addition, strict dimensional management is not required for the portions other than the portion contacting with the rail side raceway surfaces 21 and 22, and thus the lubricant supply member 50 is easily manufactured. Incidentally, a gap of tens of μm is provided between the lower flank of the substantially semicircular rail side raceway surface 21 and the ball, and the lower flank does not contact with the ball. Thus, the lower flank is also not brought into contact with the protrusions 51 and 52 of the lubricant supply member 50.

As described above, the linear guide 10 of this embodiment includes a lubricant supply member 50 which can be impregnated with the lubricant and the lubricating unit 33 which is attached in the axial end portion of the slider 30. Further, the lubricant supply member 50 includes the first recessed part 53 which is formed above the guide rail 20, the pair of second recessed parts 54 which are formed at both left and right side-surface positions of the guide rail 20, and the protrusions 51 and 52 which are slidable on the rail side raceway surfaces 21 and 22. In addition, the lubricating unit 33 includes the first cylindrical part 44 which is arranged in the first recessed part 53 to allow the first recessed part 53 to move in the vertical direction of the slider 30, and to press the first recessed part 53 to the widthwise outside of the slider 30, and the pair of second cylindrical parts 45 which are arranged in the pair of second recessed parts 54 to allow the pair of second recessed parts 54 to move in the width direction of the slider 30, and to press the pair of second recessed parts 54 in the vertical direction of the slider 30. Accordingly, the amount of the impregnated lubricant decreases with the long-term use. Although the dimension of the lubricant supply member 50 is reduced, the first recessed part 53 is pressed to the widthwise outside of the slider 30 by the first cylindrical part 44, and the pair of second recessed parts 54 are pressed in the vertical direction of the slider 30 by the pair of second cylindrical parts 45, respectively. Thus, the force of the protrusions 51 and 52 of the lubricant supply member 50 pressing the rail side raceway surfaces 21 and 22 is secured, and the supply of the lubricant is maintained over a long period of time.

The lubricating unit 33 includes the lubricant supply member 50 and the case 40 housing the lubricant supply member 50, and the first cylindrical part 44 and the pair of second cylindrical parts 45 are provided in the case 40. Thus, the number of components can be reduced, and the lubricant supply member 50 can be protected compared to a case where the case 40 and the cylindrical parts 44 and 45 are configured as separate components.

The outer diameters D3 and D3' of the first cylindrical part 44 and the pair of second cylindrical parts 45 are larger than the width D1 of the first recessed part 53 and the width D1' of the pair of second recessed parts 54. Thus, the first recessed part 53 and the pair of second recessed parts 54 can be pressed in the width direction and the vertical direction by the cylindrical parts 44 and 45, respectively.

The chamfered parts 46 are provided in the tip side edge parts of the first cylindrical part 44 and the pair of second cylindrical parts 45. Thus, the first cylindrical part 44 and the pair of second cylindrical parts 45 can be easily incorporated into the first recessed part 53 and the pair of second recessed parts 54.

The lubricant supply member 50 is impregnated with the lubricant of 70 wt % or more. Thus, the lubricant can be stably supplied over a long period of time.

The lower surface of the first cylindrical part 44 has the flat surface part 48 which is notched in the horizontal direction. Thus, it is possible to widen the width S of the lubricant supply member 50 arranged between the upper surface 24 of the guide rail 20 and the flat surface part 48 and to improve the strength of the lubricant supply member 50.

Second Embodiment

Figure 11:
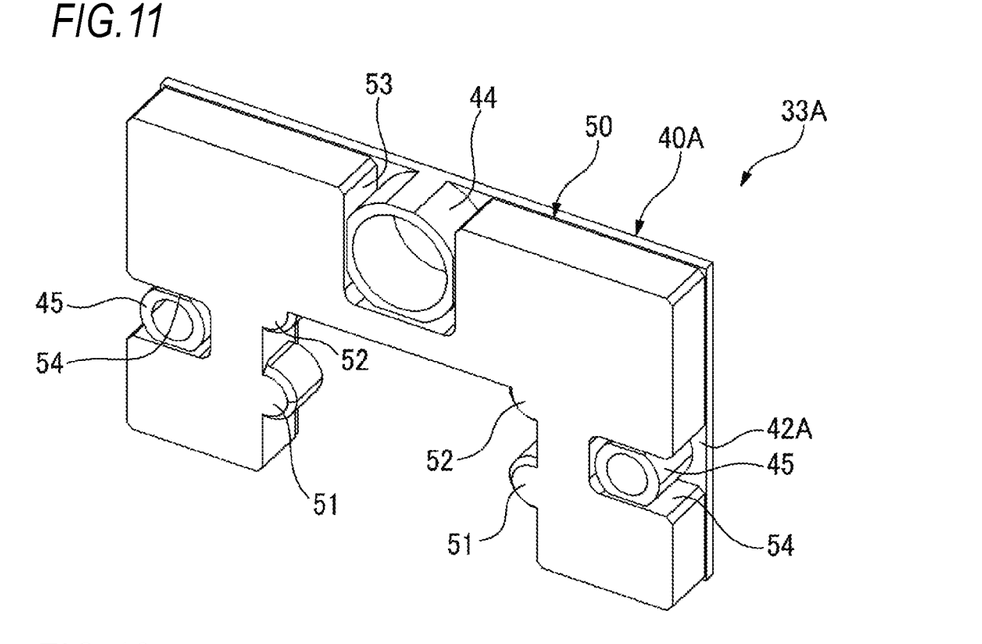
FIG. 11 is a perspective view illustrating a lubricant supply member and a case of a lubricating unit of a second embodiment.
Figure 12:
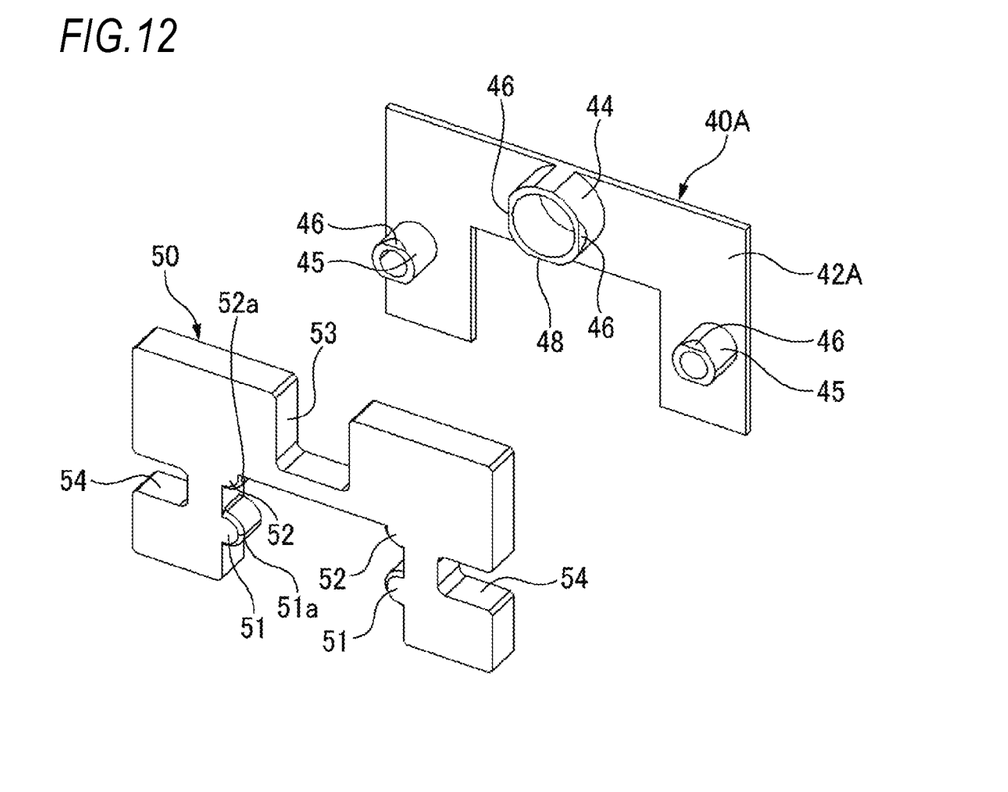
FIG. 12 is an exploded perspective view illustrating the lubricant supply member of the lubricating unit and the case illustrated in FIG. 11.

FIG. 11 is a perspective view illustrating a lubricant supply member and a case of a lubricating unit of a second embodiment, and FIG. 12 is an exploded perspective view illustrating the lubricant supply member and the case. In a lubricating unit 33A of this embodiment, a pressing plate 40A is used instead of the case 40 of the first embodiment. The other parts are the same as those of the lubricating unit 33 of the first embodiment. Thus, the same or corresponding reference signs denote the same components, and the explanation thereof is simplified or omitted.

The pressing plate 40A of this embodiment is also manufactured by injection-molding a hard resin such as a polyacetal or a polyamide and is formed in a substantially U-shape having almost the same size of the end cap 32.

Incidentally, the pressing plate 40A may be manufactured by cutting or pressing a metal material such as steel or aluminum.

The pressing plate 40A of this embodiment does not have the outer peripheral wall 41 included by the case 40 of the first embodiment. The pressing plate 40A is configured by a plate part 42A which is formed in a substantially U-shape having almost the same size as the end cap 32, and the first cylindrical part 44 as an upper pressing unit protruding from the plate part 42A and the pair of second cylindrical parts 45 as side surface pressing units which are positioned to correspond to the first and second recessed parts 53 and 54 of the lubricant supply member 50.

In the lubricant supply member 50, the first and second cylindrical parts 44 and 45 are fitted into the first and second recessed parts 53 and 54, respectively, and the lubricant supply member 50 is assembled to be brought into close contact with the plate part 42A. According to the lubricating unit 33A of this embodiment, the volume of the lubricant supply member 50 can be increased by the amount of the outer peripheral wall 41, and the lubricant supply member 50 can hold more lubricants. The other configurations and effects are the same as those of the first embodiment.

Incidentally, the invention is not limited to the above-described embodiments and may be modified and improved as appropriate.

Figure 13:
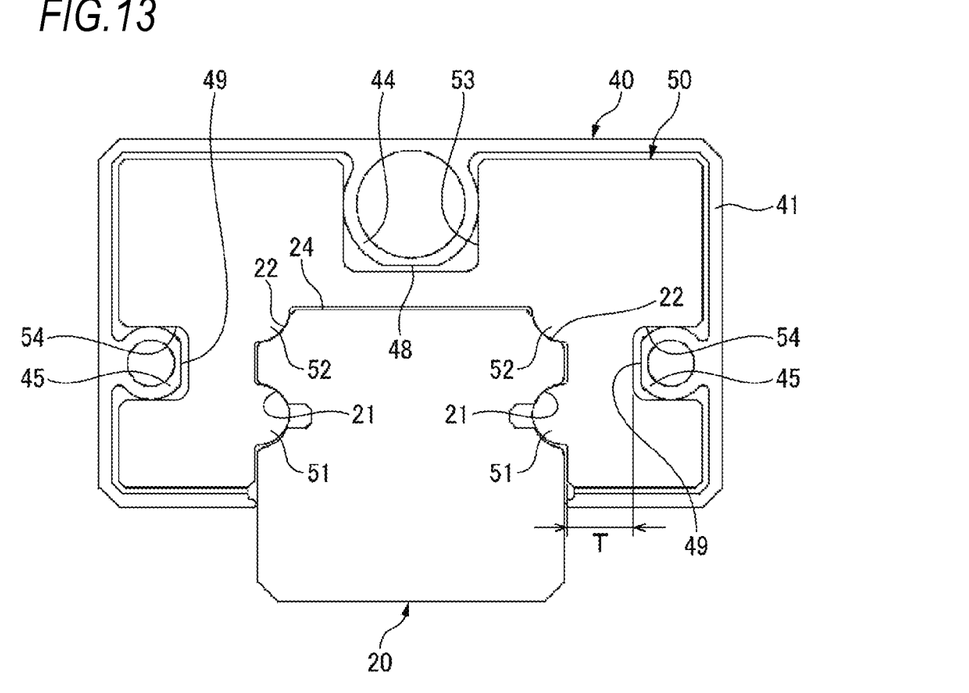
FIG. 13 is a side view illustrating a state where a lubricant supply member of a lubricating unit according to a modification of the invention is housed in a case.

For example, as in the modification illustrated in FIG. 13, the widthwise side surface of the second cylindrical part 45 having a cylindrical shape is notched in the vertical direction, and the flat surface part 49 may be provided. Accordingly, the distance between the side surface 23 of the guide rail 20 and the flat surface part 49 of the second cylindrical part 45 is increased, the width T of the lubricant supply member 50 arranged between the side surface 23 and the flat surface part 49 can be widened, and the strength of the lubricant supply member 50 is improved further. Accordingly, even when the content of the lubricant is increased, the possibility of the deformation or the breakage of the lubricant supply member 50 is reduced, and the handling is facilitated.

Figure 14:
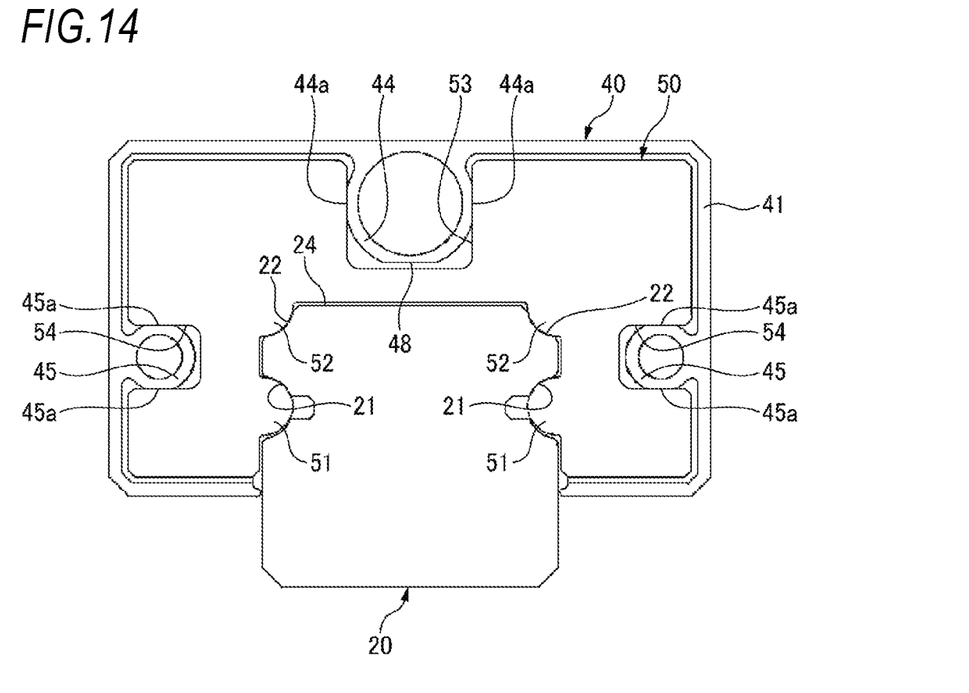
FIG. 14 is a side view illustrating a state where a lubricant supply member of a lubricating unit according to another modification of the invention is housed in a case.

As in another modification illustrated in FIG. 14, other flat surface parts 44a notched along the vertical direction may be formed in the both widthwise side surfaces of the first cylindrical part 44. In addition, other flat surface parts 45a notched along the horizontal direction may be formed in the both vertical side surfaces of the second cylindrical part 45. Accordingly, even in a case where the lubricant supply member 50 contracts, the posture of the lubricant supply member 50 can be stabilized.

Incidentally, the configurations illustrated in FIGS. 13 and 14 can be applied to any of the first and second embodiments and can be applied to the combination of both embodiments.

The present application is based on Japanese Patent Application No. 2016-172883 filed on Sep. 5, 2016, the contents of which are hereby incorporated by reference.

DESCRIPTION OF REFERENCE NUMERALS

10: linear guide
20: guide rail
21, 22: rail side raceway surface
30: slider
33, 33A: lubricating unit
40: case
40A: pressing plate
44: first cylindrical part (upper pressing unit)
45: second cylindrical part (side surface pressing unit)
46: chamfered part
50: lubricant supply member
51, 52: protrusion
53: first recessed part
54: second recessed part
D1, D1': inner width (lateral width of first recessed part and vertical width of second recessed part)
D3, D3': outer diameter

The invention claimed is:

1. A linear guide comprising:
a guide rail;
a slider slidably engaged to straddle the guide rail; and
a lubricating unit including a lubricant supply member capable of being impregnated with a lubricant, the lubricating unit being attached in an axial end portion of the slider, wherein:
the lubricant supply member includes a first recessed part formed above the guide rail, a pair of second recessed parts formed at both left and right side-surface positions of the guide rail, and protrusions slidable on rail side raceway surfaces of the guide rail; and
the lubricating unit includes:
an upper pressing unit, arranged in the first recessed part, to allow the first recessed part to move in a vertical direction of the slider, and to press the first recessed part to a widthwise outside of the slider; and
a pair of side surface pressing units, arranged in the pair of second recessed parts, to allow the pair of second recessed parts to move in a width direction of the slider, and to press the pair of second recessed parts in the vertical direction of the slider, respectively.

2. The linear guide according to claim 1, wherein:
the lubricating unit includes the lubricant supply member and a case housing the lubricant supply member; and
the upper pressing unit and the pair of side surface pressing units are provided in the case.

3. The linear guide according to claim 1, wherein at least one of the upper pressing unit and the pair of side surface pressing units is a cylindrical part of which an outer diameter is larger than a width of the first recessed part and widths of the pair of second recessed parts.

4. The linear guide according to claim 3, wherein chamfered parts are provided in tip side edge parts of the cylindrical parts configuring the upper pressing unit and the pair of side surface pressing units.

5. The linear guide according claim 1, wherein a lower surface of the upper pressing unit has a flat surface part notched in a horizontal direction.

6. The linear guide according claim 1, wherein a widthwise side surface of the side surface pressing unit has a flat surface part notched in a vertical direction.

* * * * *